(12) United States Patent
Suzuki et al.

(10) Patent No.: US 8,889,290 B2
(45) Date of Patent: Nov. 18, 2014

(54) ELECTRODE FOR LITHIUM ION BATTERY, MANUFACTURING METHOD THEREOF, LITHIUM ION BATTERY, AND MANUFACTURING METHOD THEREOF

(75) Inventors: Takaaki Suzuki, Kasama (JP); Etsuko Nishimura, Hitachiota (JP); Toshio Abe, Naka-gun (JP); Chieko Araki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 13/538,939

(22) Filed: Jun. 29, 2012

(65) Prior Publication Data

US 2013/0004843 A1    Jan. 3, 2013

(30) Foreign Application Priority Data

Jun. 29, 2011    (JP) ................. 2011-144311

(51) Int. Cl.
| | | |
|---|---|---|
| H01M 4/02 | (2006.01) | |
| H01M 4/62 | (2006.01) | |
| H01M 4/13 | (2010.01) | |
| H01M 10/0525 | (2010.01) | |
| H01M 4/66 | (2006.01) | |
| H01M 4/133 | (2010.01) | |
| H01M 4/131 | (2010.01) | |

(52) U.S. Cl.
CPC ............. H01M 4/13 (2013.01); *Y02E 60/122* (2013.01); *H01M 10/0525* (2013.01); *Y02T 10/7011* (2013.01); *H01M 4/661* (2013.01); *H01M 4/133* (2013.01); *H01M 4/131* (2013.01); *H01M 4/621* (2013.01)
USPC .......................... 429/209; 429/232; 429/235

(58) Field of Classification Search
USPC ........................................ 429/209, 232, 235
See application file for complete search history.

(56) References Cited

U.S. PATENT DOCUMENTS

| | | | | |
|---|---|---|---|---|
| 5,498,489 | A | * | 3/1996 | Dasgupta et al. ............. 429/152 |
| 2010/0323241 | A1 | * | 12/2010 | Kawakami et al. ........... 429/207 |
| 2011/0171525 | A1 | | 7/2011 | Abe et al. |
| 2012/0135304 | A1 | | 5/2012 | Uchida et al. |

FOREIGN PATENT DOCUMENTS

| | | |
|---|---|---|
| JP | 11-073947 A | 3/1999 |
| JP | 11-73947 A | 3/1999 |
| JP | 2004-288520 A | 10/2004 |
| JP | 2008-027633 A | 2/2008 |
| JP | 2011-146131 A | 7/2011 |
| JP | 2011-192610 A | 9/2011 |
| WO | 2011/013414 A1 | 2/2011 |

* cited by examiner

*Primary Examiner* — Jane Rhee
(74) *Attorney, Agent, or Firm* — Volpe and Koenig, P.C.

(57) ABSTRACT

An electrode for a lithium-ion secondary battery includes a collector of copper or the like, an electrode material layer being form on one surface and both surfaces of the collector and including an active material and a binder, and a binder-rich layer being formed in a dot shape or a stripe shape with a predetermined interval in the interface between the collector and the electrode material layer and having a binder concentration higher than that of the electrode material layer. Accordingly, a concentration gradient of the binder is provided to the surface of the collector. By arranging the binder-rich layer at a predetermined interval, it is possible to improve the adhesiveness between the collector and the electrode material layer due to an anchor effect and to guarantee conductivity between the collector and the electrode material layer.

15 Claims, 4 Drawing Sheets

ELECTRODE FOR LITHIUM ION BATTERY, MANUFACTURING METHOD THEREOF, LITHIUM ION BATTERY, AND MANUFACTURING METHOD THEREOF

BACKGROUND OF THE INVENTION

1. Field of the Invention

The present invention relates to an electrode for a lithium-ion secondary battery, a manufacturing method thereof, a lithium-ion secondary battery using the electrode, and a manufacturing method thereof.

2. Background Art

Rechargeable batteries with a non-aqueous electrolyte such as a lithium-ion secondary battery have attracted attention for use in electric vehicles or for energy storage, since the output power is high and the energy density is high. Examples of the application for the electric vehicles include zero-emission electric vehicles without an engine mounted, hybrid electric vehicles with both an engine and a rechargeable battery mounted, and plug-in hybrid electric vehicles charged directly from a system power source. Examples of the energy storage uses include a stationary electric power storage system supplying power stored in advance to desired positions in a state of emergency in which a normal power supply system is out of order.

When the rechargeable batteries are applied to the electric vehicles and the like, output characteristics such as the output power or the energy density and lifetime characteristics are important factors in the relevant fields. Specifically, the lithium ion batteries have a problem in that the capacity of the lithium-ion secondary battery deteriorates by repeating charging and discharging operations over a long period of time. One reason thereof is that a material layer is peeled off from a collector due to expansion and contraction of the volume of an active material accompanying charging-discharging reactions, that is, that the adhesive force between the collector and the material layer (active material layer) is low.

The related techniques in which an adhesive layer or a conductive intermediate layer is interposed between a collector and a material layer so as to solve the above-mentioned problem are disclosed in JP-A-11-73947, JP-A-2004-288520, and JP-A-2008-27633.

In an electrode for a battery disclosed in JP-A-11-73947, an adhesive layer including at least one of an organic titanium compound and a silane coupling agent is formed on a surface of a collector in a dot shape, a stripe shape, or a lattice shape, particularly, so as to improve the adhesiveness between an electrode material layer and a collector in a cathode.

In an anode for a lithium-ion secondary battery disclosed in JP-A-2004-288520, a conductive intermediate layer including conductive particles and a second binder is disposed between a material layer including active material particles containing silicon and/or a silicon alloy and a binder and a metal-foil collector so as to improve conductivity and adhesiveness between the collector and an active material.

In an electrode for a lithium-ion secondary battery disclosed in JP-A-2008-27633, in order to avoid hindrance to electrolytic solution penetration due to swelling and to improve high-rate discharge characteristics (high-output-power characteristics), a first material layer having a large amount of binder (binder components) is formed on a collector, a second material layer having a smaller amount of binder is stacked on the first material layer, and grooves are formed on a surface of the material layer, whereby the binder concentration in the material layer is higher on the surface side than on the collector side.

However, in the electrode for a battery disclosed in JP-A-11-73947, the adhesive force between the material layer and the collector can be enhanced by using at least one of the organic titanium compound and the silane coupling agent as an adhesive, but there is a problem in that since it is very difficult to exclude moisture produced through the reaction from the electrode, the surface of the collector is oxidized to increase the resistance of the battery.

In the anode of a lithium-ion secondary battery disclosed in JP-A-2004-288520, it is possible to achieve the compatibility of the conductivity and the adhesiveness between the metal-foil collector and the material layer by disposing the conductive intermediate layer including the conductive particles and the second binder between the material layer and the metal-foil collector, but the adhesive force between the metal-foil collector and the material layer contributes to the unevenness of the surface of the collector and it is thus necessary to perform a surface treatment on the surface of the collector in advance so as to enhance the adhesive force between the material layer and the collector.

In the electrode for a lithium-ion secondary battery disclosed in JP-A-2008-27633, it is possible to enhance the adhesive force between the collector and the material layer by forming the first material layer having a large amount of binder (binder components) on the collector, but there is a problem in that the conductivity between the material layer (active material) and the collector is lowered because the overall surface of the collector is covered with the material layer having a large amount of binder.

SUMMARY OF THE INVENTION

The invention is made in consideration of the circumstances, and an object thereof is to provide an electrode for a lithium-ion secondary battery having superior adhesiveness and conductivity between a collector and a material layer, a manufacturing method thereof, a lithium-ion secondary battery having superior cycle characteristics and lifetime characteristics by using the electrode for a lithium-ion secondary battery, and a manufacturing method thereof.

According to an aspect of the invention, there is provided an electrode for a lithium-ion secondary battery including: a collector; a material layer that is formed on one surface or both surfaces of the collector and that includes an active material and a binder; and a binder-rich layer that is disposed at a predetermined interval in an interface between the collector and the material layer and that has a binder concentration higher than that of the material layer.

The binder-rich layer may be arranged in a dot shape or a stripe shape with the predetermined interval.

According to another aspect of the invention, there is provided a method of manufacturing an electrode for a lithium-ion secondary battery having a collector and a material layer being formed on one surface or both surfaces of the collector and including an active material and a binder, including: a first step of forming a binder-rich layer having a binder concentration higher than that of the material layer at a predetermined interval on the collector so as to expose a part of a surface of the collector; and a second step of forming the material layer on the collector having the binder-rich layer formed thereon.

As can be seen from the above description, according to the aspects of the invention, it is possible to provide a cathode and an anode for a lithium-ion secondary battery having superior adhesiveness and conductivity between a collector and a material layer and a lithium-ion secondary battery having superior lifetime characteristics.

Other objects, constitutions, and advantages will become apparent from the following description of embodiments.

DETAILED DESCRIPTION OF THE INVENTION

Hereinafter, an electrode for a lithium-ion secondary battery, a manufacturing method thereof, a lithium-ion secondary battery, and a manufacturing method thereof according to embodiments of the invention will be described in detail with reference to the accompanying drawings.

Figure 1:
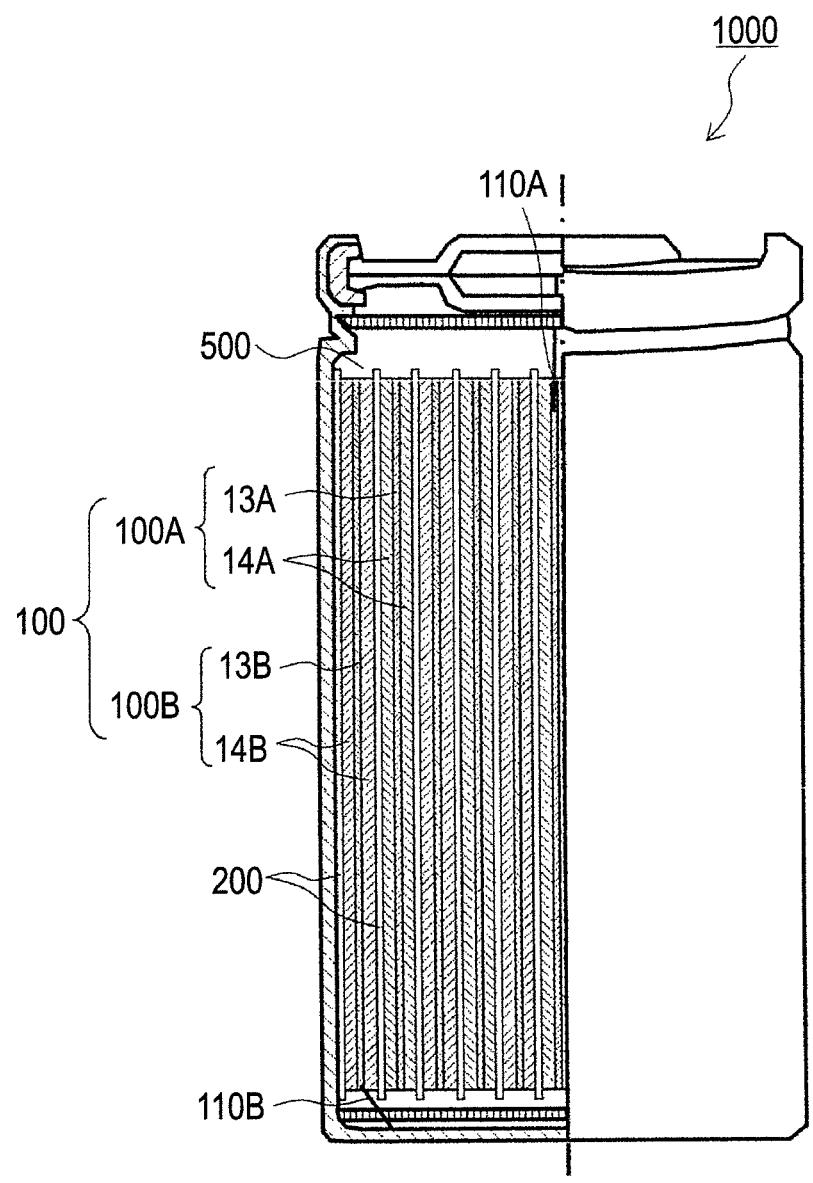
FIG. 1 is a partial longitudinal cross-sectional view illustrating the overall constitution of a rechargeable battery to which an electrode for a lithium-ion secondary battery according to an embodiment of the invention is applied.

FIG. 1 is a partial longitudinal cross-sectional view illustrating the overall constitution of a rechargeable battery to which an electrode for a lithium-ion secondary battery according to an embodiment of the invention is applied.

A rechargeable battery 1000 substantially includes a cathode 100A and an anode 100B as an electrode 100 reversely occluding and discharging lithium ions, a separator 200 interposed between the cathode 100A and the anode 100B, and an organic electrolytic solution 500 in which an electrolyte including lithium ions is dissolved. Here, the cathode 100A substantially includes a cathode collector 13A and cathode material layers 14A disposed on both surfaces thereof. An end of a cathode lead 110A is welded to the cathode collector 13A so as to lead out the collected electricity of the cathode 100A. The anode 100B substantially includes an anode collector 13B and anode material layers 14B disposed on both surfaces thereof. An end of an anode lead 110B is welded to the anode collector 13B so as to lead out the collected electricity of the anode 100B.

Figure 2:
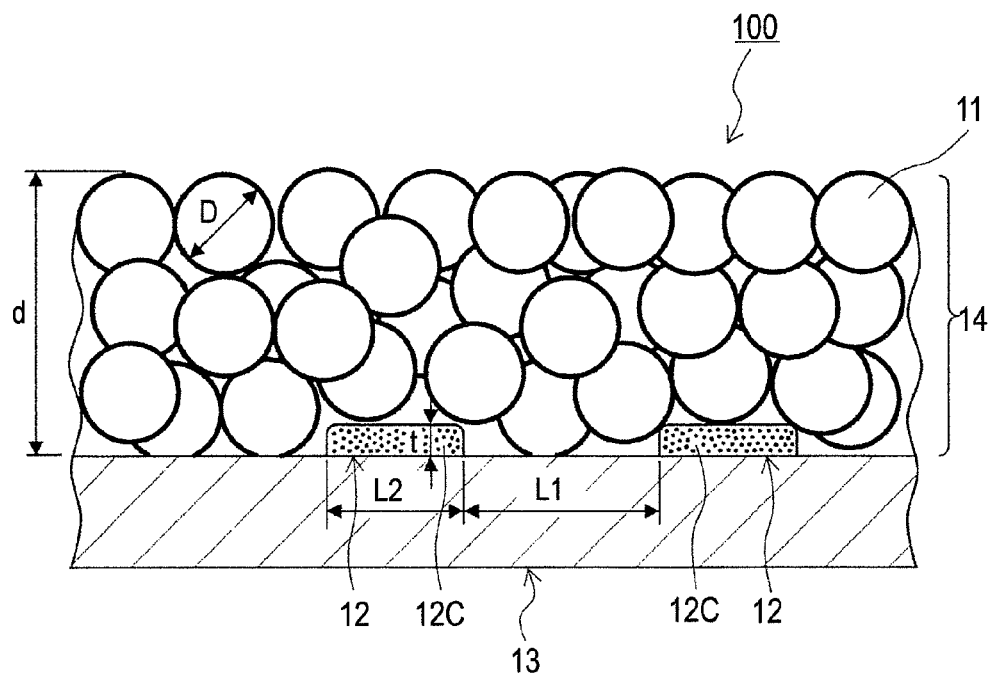
FIG. 2 is a longitudinal cross-sectional view illustrating a basic constitution of an electrode for a lithium-ion secondary battery according to an embodiment of the invention.
Figure 3:
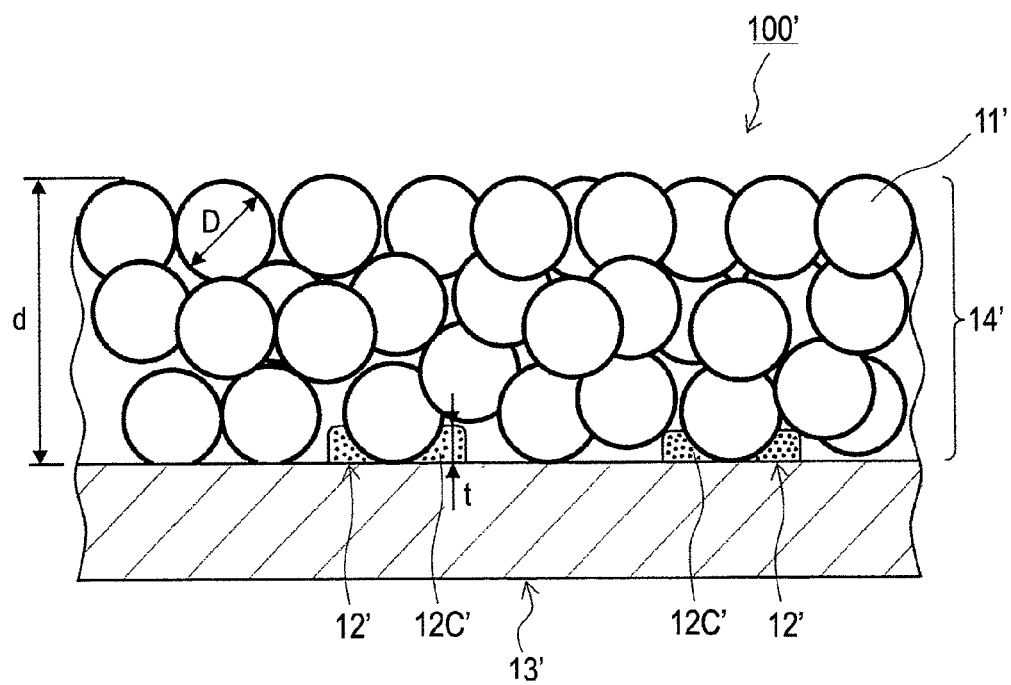
FIG. 3 is a longitudinal cross-sectional view illustrating a modification of the electrode for a lithium-ion secondary battery shown in FIG. 2.

An electrode for a lithium-ion secondary battery according to an embodiment of the invention will be described below with reference to FIGS. 2 and 3. FIG. 2 shows a basic constitution of the electrode for a lithium-ion secondary battery according to the embodiment of the invention and FIG. 3 shows a modification of the electrode for a lithium-ion secondary battery shown in FIG. 2. The electrode 100 for a lithium-ion secondary battery shown in FIGS. 2 and 3 includes an electrode material layer (material layer) on one surface of the collector and a binder-rich layer having a relatively-high binder concentration is disposed in an interface between the collector and the electrode material layer. As shown in FIG. 1, the electrode material layer may be disposed on both surfaces of the collector and the binder-rich layer may be disposed on both surfaces or one surface of the collector. The constitution of the electrode 100 for a lithium-ion secondary battery shown in FIGS. 2 and 3 can be applied to both the cathode 100A and the anode 100B for a lithium-ion secondary battery.

The electrode 100 for a lithium-ion secondary battery shown in FIG. 2 includes a collector 13, an electrode material layer 14 formed on one surface of the collector 13, and a binder-rich layer 12 arranged at a predetermined interval in an interface between the collector 13 and the electrode material layer 14. Here, the electrode material layer 14 mainly includes a first binder and an active material 11, the binder-rich layer 12 mainly includes a second binder 12C, and the binder concentration of the second binder 12C included in the binder-rich layer 12 is higher than the binder concentration of the first binder included in the electrode material layer 14. Accordingly, as shown in the drawing, by arranging the binder-rich layer 12 having a relatively-higher binder concentration at a predetermined interval on the collector 13, a concentration gradient of the binder can be formed on the surface of the collector 13, for example, in the winding direction of the electrode 100 or in the direction (the width direction of the electrode 100) perpendicular to the winding direction.

In a method of manufacturing the electrode 100 for a lithium-ion secondary battery, the binder-rich layer 12 is first formed on the collector 13 (first step). Here, the binder-rich layer 12 formed on the collector 13 has only to be formed at a predetermined interval so as to partially expose the surface of the collector 13 and can be formed, for example, in a dot shape, a stripe shape, or a lattice shape. For example, when the binder-rich layer is formed in the stripe shape, the binder-rich layer can be formed at a predetermined interval in the winding direction of the electrode 100 or in the direction perpendicular to the winding direction.

Subsequently, a slurry including the first binder and the active material 11 is applied onto the collector 13 having the binder-rich layer 12 formed thereon to form the electrode material layer 14 (second step).

As described above, by forming the binder-rich layer 12 having a higher binder concentration on the collector 13 in the first step, it is possible to suppress the production of impurities such as moisture and to enhance the adhesive force between the collector 13 and the binder-rich layer 12 as known in the related art. By forming the binder-rich layer 12 at a predetermined interval on the collector 13 so as to expose a part of the surface of the collector 13, it is possible to further improve the coupling relationship between the collector 13 and the active material 11 in the electrode material layer 14 formed on the collector 13 in the second step due to the anchor effect of the binder-rich layer 12 and the active material 11 having superior adhesiveness and thus to effectively enhance the adhesive force between the collector 13 and the electrode material layer 14.

By binding the electrode material layer 14 applied in the second step and the binder-rich layer 12 having a higher binder concentration to each other, the binding of the active materials 11 and the binding of the electrode material layer 14 and the collector 13 are further strengthened. By forming the binder-rich layer 12 at a predetermined interval so as to expose a part of the surface of the collector 13, the binder in the electrode material layer 14 can be made to adhere directly to the collector 13. Accordingly, since the electrode material layer 14 can be made to adhere to both the collector 13 and the binder-rich layer 12 and the binder in the electrode material layer 14 can be made to directly contribute to the improvement in adhesiveness to the collector 13, it is possible to further improve the adhesiveness between the collector 13 and the electrode material layer 14.

The specific constitution of the binder-rich layer 12 formed on the collector 13 will be described below.

A width L2 of the binder-rich layer 12 shown in FIG. 2 is equal to or greater than an average particle diameter D of the active material 11 and is equal to or less than a thickness d of the electrode material layer 14, as expressed by Expression 1.

Expression 1

$$D \leq L2 \leq d \tag{1}$$

Since the width L2 of the binder-rich layer 12 is equal to or greater than the average particle diameter D of the active material 11, at least one piece of active material 11 can be brought into contact with the binder-rich layer 12 having a high binder concentration, thereby effectively enhancing the adhesive force between the electrode material layer 14 and the collector 13. Since the width L2 of the binder-rich layer 12 is equal to or less than the thickness d of the electrode material layer 14, the difference between the distance from the exposed surface of the collector 13 to a surface of the electrode material layer 14 (which corresponds to the thickness d of the electrode material layer 14) and the distance from the exposed surface of the collector 13 to the surface of the electrode material layer 14 on the binder-rich layer 12 can be suppressed, thereby keeping the resistance of the electrode material layer 14 substantially uniform over the entire electrode.

A pitch (interval) L1 of the binder-rich layer 12 is equal to or greater than the average particle diameter D of the active material 11, as expressed by Expression 2.

Expression 2

$$DS \leq L1 \tag{2}$$

Since the pitch L1 of the binder-rich layer 12 is equal to or greater than the average particle diameter D of the active material 11, the active material 11 can be present in a gap (the exposed surface of the collector 13) between the binder-rich layers 12 formed at a predetermined interval, thereby guaranteeing the conductivity between the collector 13 and the electrode material layer 14.

A thickness t of the binder-rich layer 12 is smaller than a half of the average particle diameter D of the active material 11, as expressed by Expression 3.

Expression 3

$$t \leq D/2 \tag{3}$$

For example, as shown in FIG. 3, when a part of a particle of an active material 11' is embedded in a binder-rich layer 12' and the thickness t of the binder-rich layer 12' is equal to or greater than a half (D/2) of the average particle diameter D of the active material 11', a half or more of the particle of the active material 11' is embedded in the binder-rich layer 12' and the contact area of the particle of the active material 11' embedded in the binder-rich layer 12' with another particle of the active material 11' in an electrode material layer 14' is reduced, thereby deteriorating the adhesiveness or conductivity. On the contrary, by setting the thickness t of the binder-rich layer 12' to be equal to or less than a half of the average particle diameter D of the active material 11' as shown in FIG. 3, most of the particle of the active material 11' can be brought into contact with another particle of the active material 11' in the electrode material layer 14' even when a part of the particle of the active material 11' is embedded in the binder-rich layer 12', and it is possible to guarantee the contact area of the particle of the active material 11' with another particle of the active material 11' in the electrode material layer 14', thereby guaranteeing the adhesiveness or conductivity between the collector 13' and the electrode material layer 14'. Even when the thickness t of the binder-rich layer 12' is equal to or less than a half (D/2) of the average particle diameter D of the active material 11', it is possible to satisfactorily prevent a shift in the transverse direction of the electrode material layer 14' relative to the collector 13' due to the anchor effect.

The binder-rich layer may be formed on both surfaces of the cathode and/or the anode depending on an electrode structure. By forming the binder-rich layer on both surfaces of the collector, it is possible to further enhance the adhesiveness and conductivity between the collector and the electrode material layer. At this time, the binder-rich layer may be disposed at symmetric positions on both the surfaces of the collector or may be disposed at asymmetric positions. Particularly, by arranging the binder-rich layer at positions alternately shifted in the winding direction of the electrode on both the surfaces of the collector, it is possible to suppress and uniformize the thickness of the electrode in manufacturing the battery and thus to manufacture a cylindrical or wound rechargeable battery having a larger capacity by raising the winding ratio of the electrode.

An ink jet technology, a printing method, or the like can be used as a method of forming the binder-rich layer. By using this method, it is possible to easily form the binder-rich layer with a desired shape or size or interval on the collector.

Here, the type of binder included in the binder-rich layer or the electrode material layer is not particularly limited, but polymer materials such as polyvinylidene difluoride (PVDF), polytetrafluoroethylene (PTFE), and polyvinylpyridine typically used to manufacture a cathode or an anode of a lithium-ion secondary battery can be used. By using the same type of binder for the binder-rich layer and the electrode material layer, it is possible to suppress the manufacturing cost.

An optimal composition of the first binder included in the electrode material layer differs depending on the type of binder. When an aqueous binder such as a styrene-butadiene rubber (SBR) is used and the binder concentration is lower than 0.8 wt %, the binding force between the active material particles may be lowered and adversely affect the manufacturing an electrode. When the binder concentration is higher than 2.0 wt %, the resistance between the electrodes increases and it is thus preferable that the binder concentration be in the range of 0.8 to 2.0 wt %.

Examples of an anode active material which can be used in this embodiment include aluminum, silicon, and tin which can form an alloy with lithium. In addition, carbon materials having a grapheme structure, that is, carbon materials such as graphite, synthetic graphite, mesophase carbon, expanded carbon, carbon fiber, vapor-growth carbon fiber, pitch-based carbon material, needle coke, petroleum coke, polyacrylonitrile carbon fiber, and carbon black which can electrochemically occlude and discharge lithium ions and amorphous carbon materials synthesized from five-membered or six-membered cyclic hydrocarbon or cyclic oxygen-containing organic compounds through pyrolysis, can be used.

$LiCoO_2$, $LiNiO_2$, and $LiMn_2O_4$ can be typically used as a cathode active material. In addition, $LiMnO_3$, $LiMn_2O_3$, $LiMnO_2$, $Li_4Mn_5O_{12}$, $LiMn_{2-x}M_xO_2$ (where M=Co, Ni, Fe, Cr, Zn, or Ta and x=0.01 to 0.2), $Li_2Mn_3MO_8$ (where M=Fe, Co, Ni, Cu, or Zn), $Li_{1-x}A_xMn_2O_4$ (where A=Mg, B, Al, Fe, Co, Ni, Cr, Zn, or Ca and x=0.01 to 0.1), $LiNi_{1-x}M_xO_2$ (where M=Co, Fe, or Ga and x=0.01 to 0.2), $LiFeO_2$, $Fe_2(SO_4)_3$, $LiCo_{1-x}M_xO_2$ (where M=Ni, Fe, or Mn and x=0.01 to 0.2), $LiNi_{1-x}M_xO_2$ (where M=Mn, Fe, Co, Al, Ga, Ca, or Mg and x=0.01 to 0.2), $Fe(MoO_4)_3$, $FeF_3$, $LiFePO_4$, and $LiMnPO_4$ can be used.

Verification of Adhesiveness and Conductivity of Electrode Having Binder-Rich Layer and Result Thereof The inventors manufactured plural electrodes for a lithium-ion secondary battery having different sizes or shapes of the binder-rich layer and verified the adhesiveness or conductivity of the electrodes for a lithium-ion secondary battery.

EXAMPLES 1 TO 5 AND COMPARATIVE EXAMPLES 1 TO 4

The inventors manufactured anodes of Examples 1 to 5 and Comparative Examples 1 to 4 in which a binder-rich layer is formed in a dot shape with a predetermined interval in an interface between a collector and an anode material layer and verified the adhesiveness or conductivity of the anodes.

Figure 4:
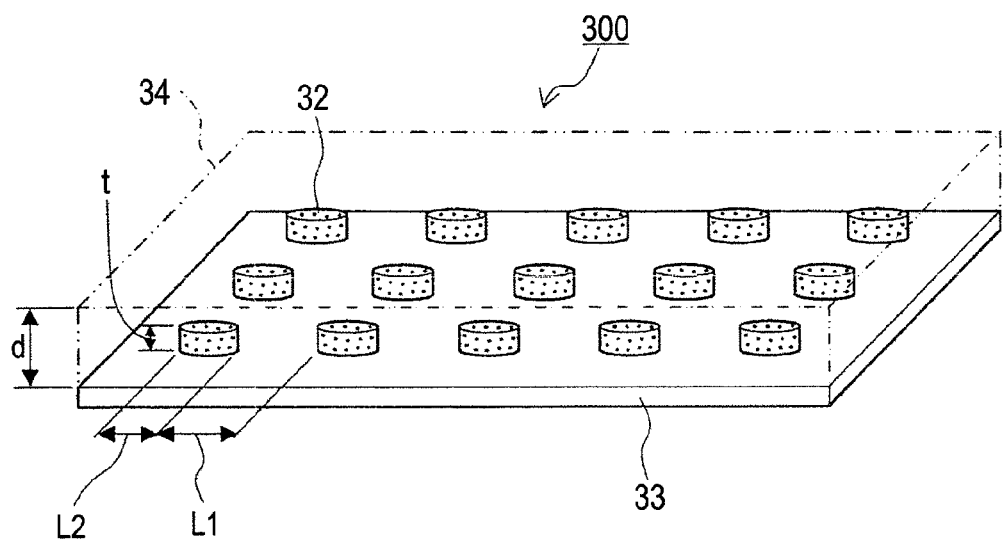
FIG. 4 is a perspective view schematically illustrating an anode for a lithium-ion secondary battery according to Example 1.

FIG. 4 shows an anode for a lithium-ion secondary battery according to Example 1.

A method of manufacturing the anode for a lithium-ion secondary battery according to Example 1 shown in the drawing will be described below. First, a dot-like binder-rich layer 32 was formed on a copper foil 33 of an anode collector through the use of an ink jet technology. Here, a binder formed of styrene-butadiene rubber (SBR) was used as the binder-rich layer 32, the diameter L2 of the binder-rich layer 32 was 30 μm, the thickness t thereof was 10 μm, and the interval L1 between the dots was 50 μm. The binder-rich layer 32 was dried in an atmosphere of 100° C. after the dot-like binder-rich layer 32 was formed.

Then, an anode material layer 34 was formed on the collector 33 having the dot-like binder-rich layer 32 formed thereon. Specifically, graphite with an average particle diameter of 20 μm was used as an anode active material, the same styrene-butadiene rubber (SBR) as used in the binder-rich layer 32 was used as the binder, and carboxymethylcellulose (CMC) was used as a viscosity modifier by the same amount as the SBR. The graphite and the binder were mixed at a mixing ratio of 97.6:2.4 and water was added thereto for viscosity modification, whereby an anode material slurry was produced. Subsequently, the anode material slurry was applied onto the copper-foil collector 33 having the dot-like binder-rich layer 32 formed thereon, was dried with hot air at 100° C., and was pressed through the use of a rolling process to adjust the thickness d of the anode material layer 34 to 50 μm, whereby an anode 300 was manufactured.

The inventors manufactured an anode according to Example 2 in which the binder used in the binder-rich layer of the anode according to Example 1 was replaced. Specifically, polyvinylidene difluoride (PVDF) was used as the binder in the binder-rich layer and the same styrene-butadiene rubber (SBR) as used in the anode according to Example 1 was used as the binder in the anode material layer.

A method of manufacturing the anode according to Example 2 will be described below. Similarly to Example 1, a binder-rich layer was formed in a dot shape on a copper foil of an anode collector through the use of an ink jet technology. Here, a binder formed of polyvinylidene difluoride (PVDF) was used as the binder-rich layer, the diameter of the binder-rich layer was 30 μm, the thickness thereof was 15 μm, and the interval between the dots was 50 μm. The binder-rich layer was dried in an atmosphere of 120° C. after the dot-like binder-rich layer was formed.

Then, an anode material layer was formed on the collector having the dot-like binder-rich layer formed thereon. Specifically, graphite with an average particle diameter of 25 μm was used as an anode active material, the SBR was used as the binder, and carboxymethylcellulose (CMC) was used as a viscosity modifier by the same amount as the SBR. The graphite and the binder were mixed at a mixing ratio of 98:2 and water was added thereto for viscosity modification, whereby an anode material slurry was produced. Subsequently, the anode material slurry was applied onto the copper-foil collector having the dot-like binder-rich layer formed thereon, was dried with hot air at 100° C., and was pressed through the use of a rolling process to adjust the thickness of the anode material layer to 50 μm, whereby the anode according to Example 2 was manufactured.

The inventors manufactured an anode according to Example 3 in which the binder used in the anode material layer of the anode according to Example 1 was replaced. Specifically, the same styrene-butadiene rubber (SBR) as used in the anode according to Example 1 was used as the binder in the binder-rich layer and polyvinylidene difluoride (PVDF) was used as the binder in the anode material layer.

A method of manufacturing the anode according to Example 3 will be described below. Similarly to Example 1, a binder-rich layer was formed in a dot shape on a copper foil of an anode collector through the use of an ink jet technology. Here, a binder formed of the same styrene-butadiene rubber (SBR) as used in the binder-rich layer according to Example 1 was used as the binder-rich layer, the diameter of the binder-rich layer was 30 the thickness thereof was 5 μm, and the interval between the dots was 50 μm. The binder-rich layer was dried in an atmosphere of 100° C. after the dot-like binder-rich layer was formed.

Then, an anode material layer was formed on the collector having the dot-like binder-rich layer formed thereon. Specifically, graphite with an average particle diameter of 15 μm was used as an anode active material and PVDF/1-methyl-2-pyrrolidone (NMP) was used as the binder. The graphite and the binder were mixed at a mixing ratio of 97:3 and the NMP was added thereto for viscosity modification, whereby an anode material slurry was produced. Subsequently, the anode material slurry was applied onto the copper-foil collector having the dot-like binder-rich layer formed thereon, was dried with hot air at 120° C., and was pressed through the use of a rolling process to adjust the thickness of the anode material layer to 50 μm, whereby the anode according to Example 3 was manufactured.

The inventors manufactured anodes according to Examples 4 and 5 in which conductive particles were added to the binder-rich layer of the anode according to Example 1. Specifically, copper particles were added to the binder in the binder-rich layer of the anode according to Example 4 and nickel particles were added to the binder in the binder-rich layer of the anode according to Example 5.

A method of manufacturing the anode according to Example 4 will be described below. A binder-rich layer was formed in a dot shape on a copper foil of an anode collector through the use of an ink jet technology. Here, a binder formed of styrene-butadiene rubber (SBR) having copper particles added thereto was used as the binder-rich layer, the diameter of the binder-rich layer was 30 μm, the thickness thereof was 10 μm, and the interval between the dots was 50 μm. The binder-rich layer was dried in an atmosphere of 100° C. after the dot-like binder-rich layer was formed.

Then, similarly to the anode according to Example 1, an anode material layer was formed on the collector having the dot-like binder-rich layer formed thereon. Specifically, graphite with an average particle diameter of 20 μm was used as an anode active material, styrene-butadiene rubber (SBR) was used as the binder, and carboxymethylcellulose (CMC) was used as a viscosity modifier by the same amount as the SBR. The graphite and the binder were mixed at a mixing ratio of 97:3 and water was added thereto for viscosity modification, whereby an anode material slurry was produced. Subsequently, the anode material slurry was applied onto the copper-foil collector having the dot-like binder-rich layer formed thereon, was dried with hot air at 100° C., and was pressed through the use of a rolling process to adjust the thickness of the anode material layer to 50 μm, whereby the anode according to Example 4 was manufactured.

A method of manufacturing the anode according to Example 5 will be described below. A binder-rich layer was formed in a dot shape on a copper foil of an anode collector using a binder including styrene-butadiene rubber (SBR) having nickel particles added thereto for the binder-rich layer through the use of an ink jet technology. The diameter of the binder-rich layer was 30 μm, the thickness thereof was 9 μm, and the interval between the dots was 50 μm. Similarly to the anode according to Example 1, an anode material layer was formed on the collector having the dot-like binder-rich layer formed thereon. Specifically, graphite with an average particle diameter of 20 μm was used as an anode active material, SBR was used as the binder, and CMC was used as a viscosity modifier by the same amount as the SBR. The graphite and the binder were mixed at a mixing ratio of 97:3 and water was added thereto for viscosity modification, whereby an anode material slurry was produced. Subsequently, the anode material slurry was applied onto the copper-foil collector having the dot-like binder-rich layer formed thereon, was dried with hot air at 100° C., and was pressed through the use of a rolling process to adjust the thickness of the anode material layer to 60 μm, whereby the anode according to Example 5 was manufactured.

The inventors manufactured anodes according to Comparative Examples 1 to 4 in which the size of the binder-rich layer in the anode according to Example 1 was changed so as to verify variations in adhesion or conductivity due to the difference in the size of the binder-rich layer.

In the anode according to Comparative Example 1, the diameter of the binder-rich layer in the anode according to Example 1 was changed to 10 μm. That is, the diameter (width) of the binder-rich layer was set to be smaller than the average particle diameter (20 μm) of the anode active material. A method of manufacturing the anode according to Comparative Example 1 was the same as Example 1, except for the above-mentioned configuration In the anode according to Comparative Example 2, the diameter of the binder-rich layer in the anode according to Example 1 was changed to 60 μm. That is, the diameter (width) of the binder-rich layer was set to be larger than the thickness (50 μm) of the anode material layer. A method of manufacturing the anode according to Comparative Example 2 was the same as Example 1, except for the above-mentioned configuration.

In the anode according to Comparative Example 3, the interval between the dots of the binder-rich layer in the anode according to Example 1 was changed to 15 μm. That is, the interval of the dots of the binder-rich layer was set to be smaller than the average particle diameter (20 μm) of the anode active material. A method of manufacturing the anode according to Comparative Example 3 was the same as Example 1, except for the above-mentioned configuration.

In the anode according to Comparative Example 4, the thickness of the binder-rich layer in the anode according to Example 1 was changed to 22 μm. That is, the thickness of the binder-rich layer was set to be larger than the average particle diameter (20 μm) of the anode active material. A method of manufacturing the anode according to Comparative Example 4 was the same as Example 1, except for the above-mentioned configuration.

The adhesion and conductivity between the anode material layer and the anode collector were verified for the anodes according to Examples 1 to 5 and Comparative Examples 1 to 4 having the dot-like binder-rich layer manufactured through the above-mentioned manufacturing methods.

Table 1 shows the types of the binder used in the binder-rich layer and the anode material layer, the sizes of the binder-rich layer, and the results of the adhesion or conductivity in the anodes according to Examples 1 to 5 and Comparative Examples 1 to 4 having the dot-like binder-rich layer.

TABLE 1

| | Binder in binder-rich layer | | | Binder in anode material layer | Peel strength (N/cm) | Capacity density (mAh/g) | Resistance (mΩ) |
| --- | --- | --- | --- | --- | --- | --- | --- |
| | diameter (μm) | Thickness (μm) | interval between dots (μm) | | | | |
| Ex. 1 | 30 | SBR 10 | 50 | SBR | 0.50 | 350 | — |
| Ex. 2 | 30 | PVDF 15 | 50 | SBR | 0.53 | 350 | — |
| Ex. 3 | 30 | SBR 5 | 50 | PVDF | — | 400 | — |
| Ex. 4 | 30 | SBR + Cu particles 10 | 50 | SBR | 0.55 | 360 | 80 |
| Ex. 5 | 30 | SBR + Ni particles 9 | 50 | SBR | 0.47 | 365 | 85 |
| Com. Ex. 1 | 10 | SBR 10 | 50 | SBR | 0.35 | — | 93 |
| Com. Ex. 2 | 60 | SBR 10 | 50 | SBR | 0.40 | — | 163 |
| Com. Ex. 3 | 30 | SBR 10 | 15 | SBR | 0.33 | — | 175 |
| Com. Ex. 4 | 30 | SBR 22 | 50 | SBR | 0.23 | — | 102 |

The test method of the adhesion and conductivity between the anode material layer and the anode collector will be specifically described below. First, the adhesion between the anode material layer and the collector in the anodes according to Examples 1 and 2 was tested. A peel test was used as the test method. In order to carry out the peel test, test samples of 50 mm×10 mm were cut out from the anodes according to the examples.

As the result of the peel test, the peel strengths of the anodes according to Examples 1 and 2 were 0.50 N/cm and 0.53 N/cm, as shown in Table 1. As a result, it was proved that the anodes according to Examples 1 and 2 have superior adhesion to the known anodes not having the binder-rich layer.

Battery characteristics of the anodes according to Examples 1 and 2 were tested using a coin cell.

As a result, it was confirmed that the capacity densities of the anodes according to Examples 1 and 2 were 350 mAh/g which was equal to the capacity density (343 mAh/g) of the known anodes not having the binder-rich layer.

Therefore, it was proved that the anodes according to Examples 1 and 2 have superior adhesion between the anode material layer and the collector due to the binder-rich layer and has the same conductivity as the anodes not having the binder-rich layer.

When manufacturing the anodes according to Examples 1 to 5, the binder-rich layer formed on the collector was dried at a high temperature of, for example, 100° C., but the binder-rich layer may be dried, for example, at the room temperature (25° C.). Even when the binder-rich layer is dried naturally in this way, a region having a high binder concentration and a region having a low binder concentration, that is, a binder concentration gradient, can be present in the vicinity of the interface between the collector and the anode material layer and it is thus possible to enhance the adhesion and conductivity between the collector and the anode material layer through the use of a simpler manufacturing process.

Then, the adhesion between the anode material layer and the collector in the anode according to Example 3 was tested. A SAICAS (Surface And Interfacial Cutting Analysis System) test was used as the test method. In order to carry out the SAICAS test, a test sample of 50 mm×10 mm was cut out from the anode according to Example 3.

As the result of the SAICAS test, it was proved that the anode according to Example 3 had a peel strength higher by about 20% than the known anodes not having the binder-rich layer. As the test result of the battery characteristics of the anode according to Example 3 using a coin cell, the capacity density thereof was 400 mAh/g.

Then, the adhesion between the anode material layer and the collector in the anodes according to Examples 4 and 5 having conductive particles added to the binder-rich layer thereof was tested. Similarly to the test method of the anodes according to Examples 1 and 2, the peel test was used as the test method. In order to carryout the peel test, test samples of 50 mm×10 mm were cut out from the anodes according to Examples 4 and 5.

As the result of the peel test, the peel strengths of the anodes according to Examples 4 and 5 were 0.55 N/cm and 0.47 N/cm, respectively. As a result, similarly to the anodes according to Examples 1 and 2, it was proved that the anodes according to Examples 4 and 5 have superior adhesion to the known anodes not having the binder-rich layer.

The conductivity of the anodes according to Examples 4 and 5 was tested through the use of a pierce-resistance measurement method.

As a result, resistance values of the anodes according to Examples 4 and 5 were about 80 mΩ and about 85 mΩ, respectively, and it was confirmed that the resistance values of the anodes according to the examples were lower than that of the known anode not having the binder-rich layer. As the test result of the battery characteristics of the anodes according to Examples 4 and 5 using a coin cell, the capacity densities thereof were 360 mAh/g and 365 mAh/g, respectively.

Accordingly, it was proved that the resistance of an electrode could be reduced by adding conductive particles such as copper or nickel to the binder of the binder-rich layer.

The conductive binder having copper particles added thereto was used for the anode according to Example 4, but particles of conductive carbon or the like may be used instead of the copper particles. The conductive binder having the nickel particles added thereto was used for the anode according to Example 5, but particles of metal such as iron, titanium, and cobalt or alloy or mixture including combinations thereof may be used instead of the nickel particles.

Then, the adhesion between the anode material layer and the collector in the anode according to Comparative Example 1 was tested through the use of the same test method (peel test) as in Example 1. As a result, it was confirmed that the peel strength of the anode according to Comparative Example 1 was lower by about 30% than the peel strength of the anode according to Example 1. That is, it was proved that the satisfactory adhesive force between the anode material layer and the collector could not be guaranteed by changing the diameter of the dot of the binder-rich layer from 30 μm to 10 μm.

The conductivity between the anode material layer and the collector in the anode according to Comparative Example 2 was tested through the use of the pierce-resistance measurement method. As a result, it was confirmed that the anode according to Comparative Example 2 has a resistance value about double the resistance of the anode according to Example 1. That is, it was proved that the resistance value increased in proportion to the diameter by changing the diameter of the dot of the binder-rich layer from 30 μm to 60 μm and thus the conductivity between the anode material layer and the collector was greatly lowered.

The conductivity between the anode material layer and the collector in the anode according to Comparative Example 3 was tested through the use of the pierce-resistance measurement method. As a result, it was confirmed that the anode according to Comparative Example 3 was higher in resistance than the anode according to Example 1, similarly to the anode according to Comparative Example 2. That is, it was proved that the binder-rich layer was densely arranged in the interface between the collector and the anode material layer by changing the interval between the dots of the binder-rich layer from 50 μm to 15 μm, and thus the conductivity between the anode material layer and the collector was greatly lowered.

The adhesion between the anode material layer and the collector in the anode according to Comparative Example 4 was tested through the use of the same test method (peel test) as in Example 1. As a result, it was confirmed that the peel strength of the anode according to Comparative Example 4 was lower than the peel strength of the anode according to Example 1. This is because the contact area between the active material in the binder-rich layer and the active material in the anode material layer was reduced by changing the diameter of the dot of the binder-rich layer from 10 μm to 22 μm and the coupling relationship between the anode material layer and the collector was deteriorated.

When binder-rich layer was formed in the interface between the collector and the electrode material layer, the binder concentration in the binder-rich layer was higher than the binder concentration in the electrode material layer and thus the overall rigidity of the electrode increased. Accordingly, when manufacturing a cylindrical or wound lithium-ion secondary battery, the productivity was lowered.

Therefore, the inventors manufactured an anode according to Example 6 which is different from the anodes according to Examples 1 to 5 in the shape of the binder-rich layer and verified the flexibility of the anode.

EXAMPLE 6

Figure 5:
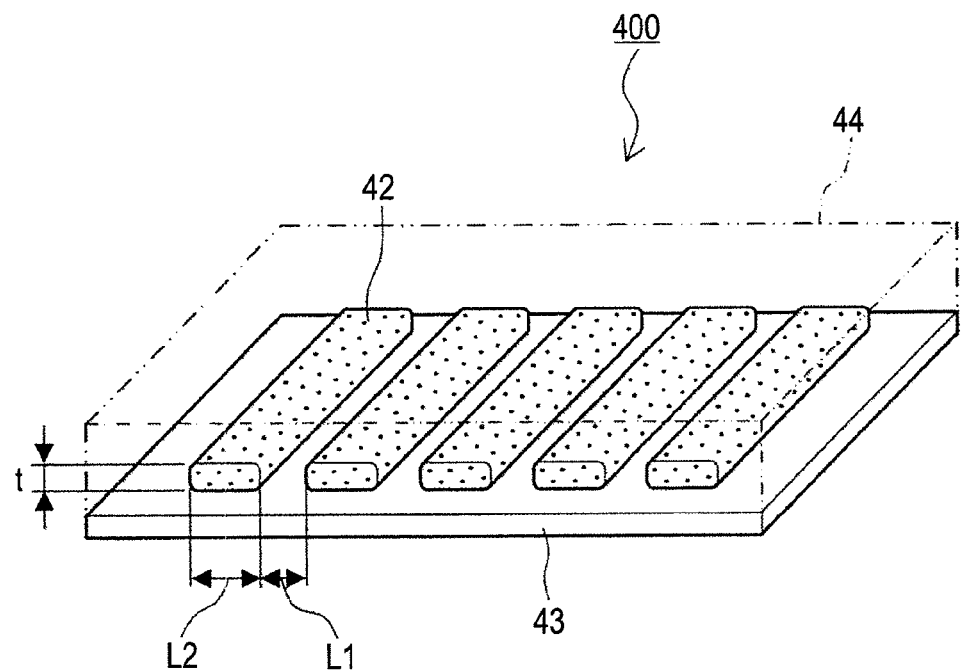
FIG. 5 is a perspective view schematically illustrating an anode for a lithium-ion secondary battery according to Example 6.

FIG. 5 shows an anode for a lithium-ion secondary battery according to Example 6 in which a stripe-like binder-rich layer was formed on a collector.

A method of manufacturing the anode for a lithium-ion secondary battery according to Example 6 shown in the drawing will be described below. First, a stripe-like binder-rich layer 42 was formed on a copper foil 43 of an anode collector through the use of a transfer printing method. Here, a binder formed of polyvinylidene difluoride (PVDF) was used as the binder-rich layer 42, the line width L2 of the binder-rich layer 42 was 15 µm, the thickness t thereof was 5 µm, and the interval L1 between the stripes was 10 µm. The binder-rich layer 42 was dried in the atmosphere of 120° C. after the stripe-like binder-rich layer 42 was formed.

Then, an anode material layer 44 was formed on the collector 43 having the stripe-like binder-rich layer 42 formed thereon. Specifically, pseudo-anisotropic carbon which is amorphous carbon with an average particle diameter of 10 µm was used as an anode active material, carbon black (CB2) as a conducting agent and PVDF as a binder were mixed therewith so that the solid weight ratio of the pseudo-anisotropic carbon:CB2:PVDF during drying was 90:5:5, and N-methyl pyrrolidone (NMP) was added as a solvent thereto, whereby an anode material slurry was produced. Subsequently, the anode material slurry was applied onto the anode collector 43 having the stripe-like binder-rich layer 42 formed thereon, was dried at 120° C., and was pressed with a pressing roller to adjust the thickness of the anode material layer 44, whereby an anode 400 was manufactured.

A bending test was carried out on the anode 400 according to Example 6 manufactured through the above-mentioned manufacturing method to evaluate the flexibility. In the test method, a test sample of 30 mm×10 mm was cut out from the anode according to Example 6, the sample was folded by 180° with a predetermined axis line extending in the length direction of the binder-rich layer as a bending center, the sample was unfolded to 0° (the original state) again, and the presence of cracks in the sample was checked.

As a result, it was proved that the anode 400 according to Example 6 did not have any crack but had the same flexibility as the known anode not having the binder-rich layer.

EXAMPLE 7

The inventors manufactured a cathode for a lithium-ion secondary battery according to Example 7 having a dot-like binder-rich layer and verified the adhesion between a collector and an electrode material layer in the cathode for a lithium-ion secondary battery according to Example 7.

A method of manufacturing the cathode for a lithium-ion secondary battery according to Example 7 will be described below. First, a binder-rich layer was formed in a dot shape on an aluminum foil of a cathode collector through the use of an ink jet technology. Here, a binder formed of polyvinylidene difluoride (PVDF) was used as the binder-rich layer, the diameter of the binder-rich layer was 25 µm, the thickness thereof was 7 µm, and the interval between the dots was 50 µm. The binder-rich layer was dried in the atmosphere of 120° C. after the dot-like binder-rich layer was formed.

Then, a cathode material layer was formed on the collector having the dot-like binder-rich layer formed thereon. Specifically, $LiMn_{1/3}Ni_{1/3}Co_{1/3}O_2$ with an average particle diameter of 15 µm as a cathode active material, carbon black (CB1) and graphite (GF2) as a conducting agent, and polyvinylidene difluoride (PVDF) as a binder were mixed so that the solid weight ratio of $LiMn_{1/3}Ni_{1/3}Co_{1/3}O_2$:CB1:GF2:PVDF during drying was 86:9:2:3, and N-methyl pyrrolidone (NMP) was added as a solvent thereto, whereby a cathode material slurry (paste) was produced. Subsequently, the cathode material slurry (paste) was applied onto an aluminum foil as a cathode collector having the dot-like binder-rich layer formed thereon, was dried at 120° C., was pressed with a pressing roller, and was additionally dried at 120° C., whereby the cathode according to Example 7 was manufactured.

A cross cut test (JIS K-5400) was carried out on the cathode according to Example 7 manufactured through the above-mentioned method and the adhesion thereof was evaluated.

As the result of the cross cut test, it was confirmed that the peeling of the cathode material layer in the cathode according to Example 7 using an adhesion tape was very small and was "point 4" based on an evaluation criterion of the cross cut test. From this test result, it was proved that the adhesion between the collector and the electrode material layer was improved even when the binder-rich layer was applied to the cathode.

Verification and Result of Cycle Characteristic of Lithium Ion Secondary Battery using Anode Having Binder-Rich Layer The inventors manufactured plural lithium ion batteries with anodes having different sizes of a binder-rich layer and verified the cycle characteristics of the lithium ion batteries.

EXAMPLE 8 AND COMPARATIVE EXAMPLES 5 TO 7

Specifically, a wound lithium-ion secondary battery according to Example 8 was manufactured using an anode having the same configuration as the anode according to Example 1 out of the electrodes according to Examples 1 to 7 manufactured through the above-mentioned methods. Wound lithium ion batteries according to Comparative Examples 5 to 7 were manufactured using anodes having the same configurations as the anodes according to Comparative Examples 1, 3, and 4 out of the anodes according to Comparative Examples 1 to 4.

Figure 6:
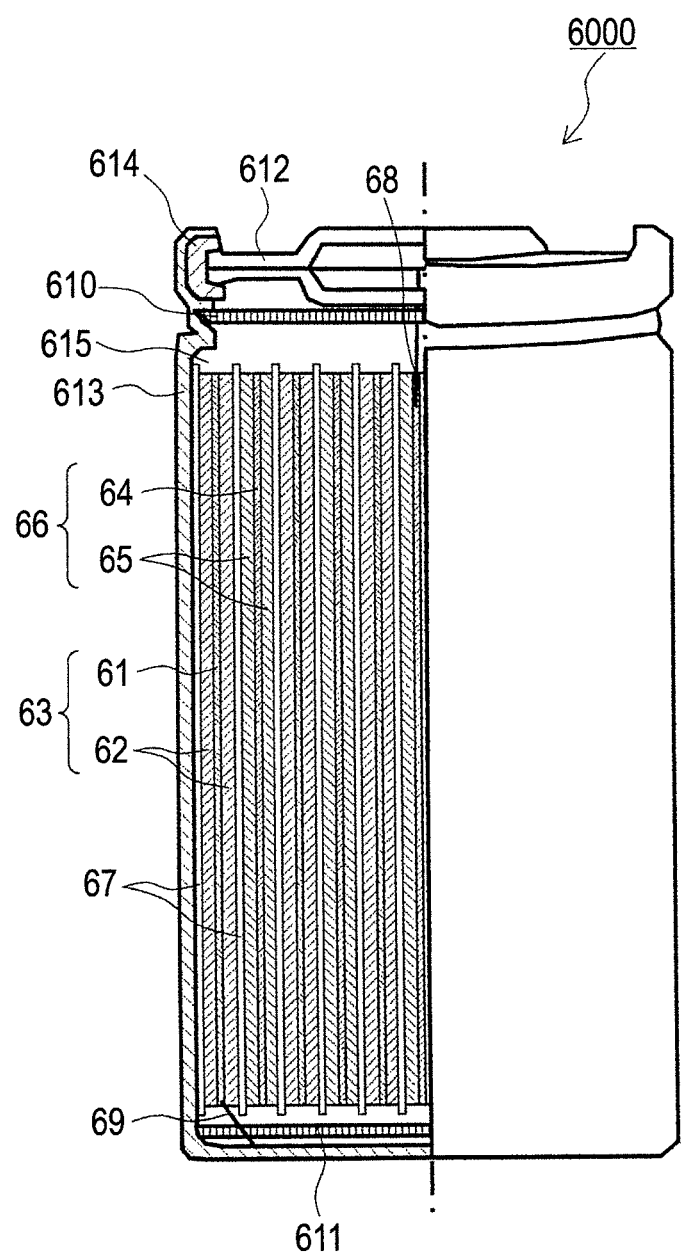
FIG. 6 is a partial cross-sectional view illustrating a wound lithium-ion secondary battery according to Example 8.

FIG. 6 is a side view illustrating the wound lithium-ion secondary battery according to Example 8, where a left portion of the drawing is broken so as to see the inside thereof. As shown in the drawing, a rechargeable battery 6000 according to Example 8 includes a cathode 66 and an anode 63 that reversibly absorb and release lithium ions, an organic electrolytic solution in which an electrolyte including lithium ions is dissolved, and a battery can 613 housing these. The cathode 66 and the anode 63 are arranged with a separator 67 interposed therebetween in the battery can 613.

A method of manufacturing the lithium-ion secondary battery according to Example 8 will be described below in brief. First, $LiMn_{1/3}Ni_{1/3}Co_{1/3}O_2$ as a cathode active material, carbon black (CB1) and graphite (GF2) as an electron conducting agent, and polyvinylidene difluoride (PVDF) as a binder were mixed so that the solid weight ratio of $LiMn_{1/3}Ni_{1/3}Co_{1/3}O_2$:CB1:GF2:PVDF during drying was 86:9:2:3, and N-methyl pyrrolidone (NMP) was added as a solvent thereto, whereby a cathode material slurry (paste) was produced. Subsequently, the cathode material slurry (paste) was applied onto both surfaces of a cathode collector 64 formed of an aluminum foil, was dried at 80° C., was pressed with a pressing roller, and was additionally dried at 120° C., whereby a cathode material layer 65 was formed on the cathode collector 64 to manufacture the cathode 66.

Then, a dot-like binder-rich layer was formed on both surfaces of an anode collector 61 formed of a copper foil through the use of the same method as the method of manufacturing the anode according to Example 1 and an anode material layer 62 was formed on both surfaces thereof to manufacture the anode 63.

Ethylene carbonate (EC), vinylene carbonate (VC), dimethyl carbonate (DMC), and ethyl methyl carbonate (EMC) were prepared, a mixture of which the volume composition ratio was EC:VC:DMC:EMC=19.8:0.2:40:40 was used as a solvent, and LiPF6 was used as a lithium salt serving as a solute, whereby 1 M was dissolved to manufacture an electrolytic solution (organic electrolytic solution) 615.

The separator 67 was interposed between the cathode 66 and the anode 63 manufactured through the above-mentioned manufacturing method to form a wound group and the wound group was inserted into the battery can 613. In order to lead out the collected electricity of the anode 63, an end of an anode lead 69 formed of nickel (Ni) was welded to the anode collector 61 and the other end was welded to the battery can 613. In order to lead out the collected electricity of the cathode 66, an end of a cathode lead 68 formed of aluminum (Al) was welded to the cathode collector 64, and the other end was welded with current cut off and was electrically connected to a cathode battery cover 612 via a current cutoff valve (not shown). The electrolytic solution 615 was injected into the battery can 613 to immerse the cathode 66, the anode 63, and the separator 67 in the electrolytic solution 615 and an opening of the battery can 613 was caulked through the use of a caulking machine or the like, whereby the wound rechargeable battery 6000 was manufactured. In FIG. 6, reference numeral 610 represents a cathode insulating material, reference numeral 611 represents an anode insulating material, and reference numeral 614 represents a gasket.

The inventors manufactured wound lithium ion batteries according to Comparative Examples 5 to 7 in which the shape of the binder-rich layer of the anode 63 of the rechargeable battery according to Example 8 was changed to the shapes of the binder-rich layers of the anodes according to Comparative Examples 1, 3, and 4, through the use of the same method as the method of manufacturing the rechargeable battery according to Example 8. Specifically, in the rechargeable battery according to Comparative Example 5, the diameter of the dot-like binder-rich layer in the anode of the rechargeable battery according to Example 8 was changed to 10 μm. In the rechargeable battery according to Comparative Example 6, the interval between the dots of the dot-like binder-rich layer in the anode of the rechargeable battery according to Example 8 was changed to 15 μm. In the rechargeable battery according to Comparative Example 7, the thickness of the dot-like binder-rich layer in the anode of the rechargeable battery according to Example 8 was changed to 22 μm.

The cycle characteristics (lifetime characteristics) of the wound lithium ion batteries according to Example 8 and Comparative Examples 5 to 7 manufactured through the use of the manufacturing method were evaluated through the use of a cycle test. Regarding the conditions of the cycle test, the rechargeable batteries were charged to 4.1 V with a constant current of 1.4 A, were charged to 4.2 V with a constant voltage, the operation was stopped for 15 minutes, the rechargeable batteries were discharged to 3.0 V with a constant current of 1.4 A, and then the operation was stopped for 15 minutes. This charging and discharging operation was repeated by 500 cycles and the variations in capacity of the rechargeable batteries before and after the cycle test were verified.

Table 2 shows the shapes of the binder-rich layers in the wound lithium ion batteries according to Example 8 and Comparative Examples 5 to 7 and the results of the cycle test.

TABLE 2

| | Binder in binder-rich layer | | | Binder in anode material layer | Capacity maintenance ratio (%) | Reference Spec. of binder-rich layer |
| --- | --- | --- | --- | --- | --- | --- |
| | Diameter (μm) | Thickness (μm) | Interval between dots (μm) | | | |
| Ex. 8 | 30 | SBR 10 | 50 | SBR | 93 | Anode according to Ex. 1 |
| Com. Ex. 5 | 10 | SBR 10 | 50 | SBR | 55 | Anode according to Com. Ex. 1 |
| Com. Ex. 6 | 30 | SBR 10 | 15 | SBR | 63 | Anode according to Com. Ex. 3 |
| Com. Ex. 7 | 30 | SBR + Cu particles 22 | 50 | SBR | 57 | Anode according to Com. Ex. 4 |

As shown in Table 2, it was confirmed as the result of the cycle test that the capacity retention after 500 cycles in the rechargeable battery according to Example 8 was 93%. The capacity retention after 500 cycles in the rechargeable batteries according to Comparative Examples 5 to 7 were 55% in Comparative Example 5, 63% in Comparative Example 6, and 57% in Comparative Example 7, respectively.

As the result, it was proved that the adhesion between the anode material layer 62 formed on both surfaces of the anode collector 61 and the anode collector 61 in the lithium-ion secondary battery according to Example 8 was enhanced by forming an appropriate shape of binder-rich layer on both surfaces of the anode collector 61 and thus the capacity retention after plural cycles in the rechargeable battery was greatly improved.

The invention is not limited to Examples 1 to 8, but may include various modifications. Examples 1 to 8 are described in detail for the purpose of easily understanding the invention and the invention does not have to include all the elements described above. Some elements of a certain example may be replaced with the elements of another example and some elements of a certain example may be added to the configuration of another example. Some elements maybe added to, maybe deleted from, or may be replaced for other elements of each of Examples 1 to 8.

Only control lines or information lines necessary for description are shown and it cannot be said to show all control lines or information lines of the product. In practice, most elements may be considered to be connected to each other.

What is claimed is:

1. An electrode for a lithium-ion secondary battery comprising:
   a collector;
   a material layer that is formed on one surface or both surfaces of the collector and that includes an active material and a binder; and
   a binder-rich layer that is disposed at a predetermined interval in an interface between the collector and the material layer and that has a binder concentration higher than that of the material layer;
   wherein the width of the binder-rich layer is equal to or greater than the average particle diameter of the active material in the material layer and equal to or less than the thickness of the material layer;
wherein the interval of the binder-rich layer is equal to or greater than the average particle diameter of the active material in the material layer; and
wherein the thickness of the binder-rich layer is equal to or less than a half of the average particle diameter of the active material in the material layer.

2. The electrode for a lithium-ion secondary battery according to claim 1, wherein the binder-rich layer is disposed on at least one surface of the collector.

3. The electrode for a lithium-ion secondary battery according to claim 1, wherein the binder-rich layer is arranged in a dot shape or a stripe shape with a predetermined interval.

4. The electrode for a lithium-ion secondary battery according to claim 3, wherein the binder-rich layer is arranged in a stripe shape with a predetermined interval in a winding direction of the electrode and/or a direction perpendicular to the winding direction.

5. The electrode for a lithium-ion secondary battery according to claim 1, wherein the binder in the binder-rich layer and the binder in the material layer are equal to or different from each other.

6. The electrode for a lithium-ion secondary battery according to claim 1, wherein the binder-rich layer has conductivity.

7. The electrode for a lithium-ion secondary battery according to claim 6, wherein the binder-rich layer includes fine particles of copper or conductive carbon.

8. The electrode for a lithium-ion secondary battery according to claim 6, wherein the binder-rich layer includes fine particles of metal such as nickel, iron, titanium, or cobalt or alloy or mixture including a combination thereof.

9. A method of manufacturing an electrode for a lithium-ion secondary battery having a collector; a material layer being formed on one surface or both surfaces of the collector and including an active material and a binder; and a binder-rich layer that is disposed at a predetermined interval in an interface between the collector and the material layer and that has a binder concentration higher than that of the material layer; wherein the width of the binder-rich layer is equal to or greater than the average particle diameter of the active material in the material layer and equal to or less than the thickness of the material layer; wherein the interval of the binder-rich layer is equal to or greater than the average particle diameter of the active material in the material layer; and wherein the thickness of the binder-rich layer is equal to or less than a half of the average particle diameter of the active material in the material layer; the method comprising:
a first step of forming the binder-rich layer having a binder concentration higher than that of the material layer at a predetermined interval on the collector so as to expose a part of the surface of the collector; and
a second step of forming the material layer on the collector having the binder-rich layer formed thereon.

10. The method of manufacturing an electrode for a lithium-ion secondary battery according to claim 9, wherein the first step includes arranging the binder-rich layer in a dot shape or a stripe shape with a predetermined interval.

11. The method of manufacturing an electrode for a lithium-ion secondary battery according to claim 10, wherein the first step includes arranging the binder-rich layer in a stripe shape with a predetermined interval in a winding direction of the electrode and/or a direction perpendicular to the winding direction.

12. The method of manufacturing an electrode for a lithium-ion secondary battery according to claim 9, wherein the first step includes forming the binder-rich layer using an ink jet technology or a printing method.

13. The method of manufacturing an electrode for a lithium-ion secondary battery according to claim 9, wherein conductive particles are added to the binder-rich layer.

14. A lithium-ion secondary battery comprising:
a cathode and an anode that are formed of the electrode for a lithium-ion secondary battery according to claim 1 and that reversibly occlude and discharge lithium ions;
a separator that is interposed between the cathode and the anode; and
an organic electrolytic solution that dissolves an electrolyte including the lithium ions and in which the cathode, the anode, and the separator are immersed.

15. A method of manufacturing a lithium-ion secondary battery, comprising the steps of:
preparing a cathode and an anode that reversibly occlude and discharge lithium ions using the electrode manufactured by the use of the method according to claim 9 as the cathode and/or the anode;
arranging the cathode and the anode with a separator interposed between; and
immersing the cathode, the anode, and the separator in an organic electrolytic solution in which an electrolyte including the lithium ions is dissolved.

* * * * *